June 6, 1933.  W. E. MacMONAGLE  1,913,336
PROCESS OF AND APPARATUS FOR MANUFACTURING PNEUMATIC TIRE BEADS
Filed Feb. 5, 1929
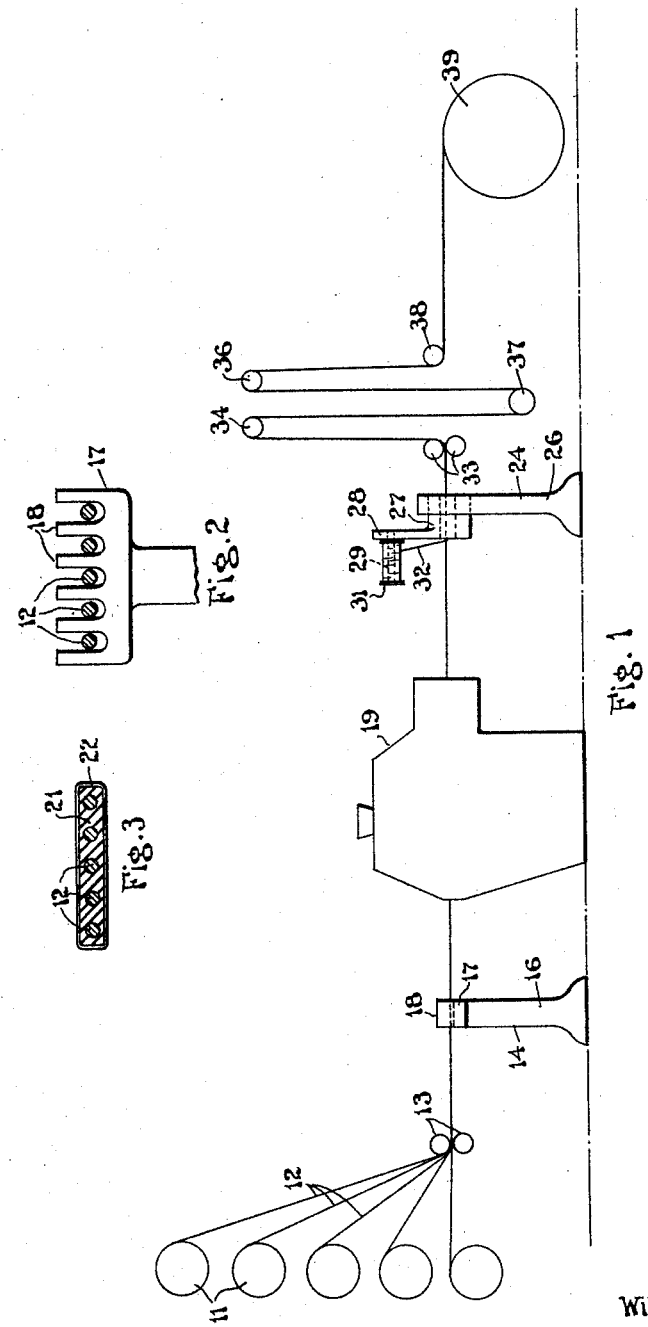
Inventor
William E. MacMonagle
By
Attorney Patented June 6, 1933

1,913,336

UNITED STATES PATENT OFFICE

WILLIAM E. MacMONAGLE, OF AKRON, OHIO, ASSIGNOR TO THE GOODYEAR TIRE & RUBBER COMPANY, OF AKRON, OHIO, A CORPORATION OF OHIO

PROCESS OF AND APPARATUS FOR MANUFACTURING PNEUMATIC TIRE BEADS

Application filed February 5, 1929. Serial No. 337,583.

This invention relates to apparatus for and methods of manufacturing the inextensible cores or centers of pneumatic tire beads, and it has particular relation to a process whereby individual strands of wire are continuously coated with rubber and are then wound into rings suitable for use as bead cores.

One object of the invention is to provide a process of and apparatus for manufacturing bead tape whereby the necessity of braiding the several strands of bead wire prior to coating them with rubber is obviated.

Another object of the invention is to provide a method of forming beads in which the strands of wire are maintained in spaced parallel relation during the process of insulation, thus permitting rubber compound to be readily forced in between the several strands of wire.

Another object of the invention is to provide a novel type of bead tape.

Heretofore, in the manufacture of cores for pneumatic tire beads, it has been customary to braid a plurality of strands of wire together to form a loosely woven flat tape which was subsequently passed through a tubing machine to coat it with rubber. The coated wire was then wound into bead rings upon a suitable form. Since the braiding operation was relatively slow, a plurality of braiding machines were required to supply tape to a single bead building machine. Hence, it was necessary to wind the braided tape onto spools or creels and store it until it was needed for the preparation of the beads. These braided tapes were then passed through a tubing or insulating machine of conventional type where they were coated with unvulcanized rubber compound and a certain amount of compound was forced between the strands of wire of which the braid was composed. Preferably the rubber coated braid was passed through a festooning device which received a continuous supply of tape from the tubing machine and supplied it intermittently to a building machine. For the latter two operations, various types of apparatus were employed, one conventional type being that illustrated in the pending application of Andrews, Serial No. 111,540, filed May 25, 1926. This method was objectionable because the apparatus required for braiding the strands of wire to form a tape was relatively expensive and also because the process of braiding itself was slow and required considerable labor. Furthermore, since it was necessary to wind the braided wire upon spools, preparatory to using it in the manufacture of bead cores, the continuity of the process was interrupted. In addition to these objectionable features, oftentimes the braid was imperfectly coated and impregnated with the rubber compound, due to the fact that the braided character of the tape made it impossible to force rubber compounds around and between all of the strands of wire of which the tape was composed.

This invention consists in the provision of an apparatus and a method whereby individual strands of wire are drawn from a source of supply, passed through a spacing device uniformly to space the different strands, and are then continuously drawn through a tubing machine in spaced parallel relation. The insulated tape thus formed is subsequently wound with a filament consisting of wire or cord, and is finally wound into rings to form bead cores or centers in the usual manner.

For a better understanding of the invention, reference may now be had to the accompanying drawing, forming a part of the specification, of which;

Figure 1 is a diagrammatic elevational view showing the assembly of apparatus employed in practicing the invention;

Figure 2 is a fragmentary elevational view of a portion of the device employed to uniformly space the several strands of bead wire; and Figure 3 is a cross-sectional view of a bead tape formed by the process involved.

In practicing the invention, a plurality of spools or creels of wire 11 are provided. Any desired number of such spools may be employed and the apparatus (not shown) for supporting them may be of substantially any desired type. Strands of bead wire 12 are continuously drawn from these spools and are passed between a pair of guide rollers 13, which serve to bring the several strands together in parallel relation with respect to each other. In order uniformly to space the strands, they are drawn through a spacing device 14 which includes a pedestal or support 16, the upper end of which is provided with a head 17 having upstanding fingers or spacer elements 18 which project between the strands of wire.

The strands of wire 12 are next drawn through a tubing or insulating machine of any conventional design illustrated diagrammatically at 19. By this means, a coating of unvulcanized rubber 21 is forced around and between the separate strands of wire to form a flat tape 22, shown in Figure 3.

Since unvulcanized rubber compounds are comparatively plastic and have but slight tensile strength, it is convenient to wind the tape with a binder element, such as a wire or cord, to thus prevent accidental distortion of the tape during the subsequent steps of assembling the beads. The application of the filament may conveniently be accomplished by means of the winding device 24. This device includes a pedestal 26 having a bearing formed adjacent the upper end thereof, in which is rotatably mounted a tubular member 27. One end of the latter element is provided with a projecting arm 28, the outer extremity of which supports a stud shaft 29, upon which is journalled a spool 31 for supplying a wrapping filament 32. The member 27 may be rotated by any convenient driving mechanism (not shown). When it is desired to wrap the tape 22 with a binding element 32, the end of the latter is attached to the tape and the element 27 is rotated, thus causing the spool 31 to travel around the tape. During this process the tape is drawn continuously through the tubing machine, and the filament 32 is wound spirally thereupon.

By providing a pair of engaging rollers 33, which are driven by any convenient source of power (not shown) the wires 12 are continuously drawn from the spools 11, through the tubing machine 19 and through the tubular portion 27 of the winding device 24.

In order to permit continuous operation of the tubing machine and the winding device, it is convenient to provide a festooning device, the rollers of which are indicated diagrammatically at 34, 36, 37 and 38. The tape from the festooning device is wound upon a drum, indicated diagrammatically at 30, of a bead forming machine of any desirable construction. The festooning rack and bead building machine illustrated in the Andrews application may be employed to practice these steps with highly satisfactory results.

By using the apparatus and method constituting this invention, the necessity of braiding the wire of which the cores of pneumatic tire beads are composed is entirely obviated, thus avoiding considerable labor and expense. Furthermore, since the individual strands of wire are entirely unconnected prior to being passed to the tubing machine, it is an easy matter to insulate completely and perfectly each individual strand of wire with a coat of rubber compound.

Although I have illustrated only one form which the invention may assume, and have described in detail only a single application thereof, it will be apparent to those skilled in the art that the invention is not so limited, but that various minor modifications may be made therein, without departing from the spirit of the invention or from the scope of the appended claims.

What I claim is:

1. An apparatus for manufacturing beads for pneumatic tires comprising means for supplying a plurality of strands of wire, means for positioning said strands in a single plane, independent means for disposing the strands while in said plane in spaced parallel relation, means spaced from said disposing means for embedding the wires while so disposed in a body of rubber, and means for winding a filament spirally about the embedded wires.

2. An apparatus for manufacturing beads for pneumatic tire casings comprising means for supplying a plurality of individual strands of wire, aligning means for disposing the strands in spaced parallel relation in a common plane, means spaced from the aligning means and independent thereof, for embedding the strands when so disposed in a unitary matrix of unvulcanized rubber, and means for winding a filament spirally about the strands when they are so embedded.

3. The herein described method of forming bead rings which comprises forming a tape composed of raw rubber reinforced by parallel longitudinal wires by feeding parallel wires longitudinally through a rubber extruding device, wrapping the tape as it issues from the extruding device and forming bead rings from the tape by winding the same in a plurality of superimposed convolutions.

4. The herein described method of forming bead rings which comprises forming a tape composed of raw rubber enveloping a row of parallel longitudinal wires by feeding parallel wires longitudinally through a chamber containing raw rubber and centrally through an extruding die in a wall of said chamber, wrapping a wire spirally around the tape issuing from the extruding die, and forming bead rings by winding the wire wrapped tape in a predetermined number of superposed convolutions.

5. Bead ring forming apparatus comprising an extruding device, means for feeding a row of parallel wires longitudinally through the extruding device to envelope the wires with a body of raw rubber, means for wrapping the tape issuing from the extruding device, and a bead ring machine to which the wrapped tape is delivered.

In witness whereof, I have hereunto signed my name at Akron, in the county of Summit and State of Ohio, U. S. A., this 4th day of February, 1929.

WILLIAM E. MacMONAGLE.